US006357503B1

(12) United States Patent
Kromer et al.

(10) Patent No.: US 6,357,503 B1
(45) Date of Patent: Mar. 19, 2002

(54) DEVICE FOR PRODUCING A STRIP WITH SELF-ADHESIVE LABELS OR OTHER MATERIALS WITH PARTS PLACED UNDERNEATH AND A DEVICE FOR LATERALLY GUIDING EDGES

(75) Inventors: Peter Kromer; Jean-François Pasquini, both of Leinfelden-Echterdingen (DE)

(73) Assignee: Pasquini und Kromer GmbH, Filderstadt (DE)

( * ) Notice: Subject to any disclaimer, the term of this patent is extended or adjusted under 35 U.S.C. 154(b) by 0 days.

(21) Appl. No.: 09/332,742

(22) Filed: Jun. 14, 1999

Related U.S. Application Data

(63) Continuation of application No. PCT/DE98/01602, filed on Jun. 13, 1998.

(51) Int. Cl.$^{7}$ ............................ B32B 35/00; G09F 3/00

(52) U.S. Cl. ........................ 156/351; 156/361; 156/367; 156/378; 156/541; 156/542

(58) Field of Search ................................ 156/249, 361, 156/362, 363, 365, 378, 351, 367, 540, 541, 542, 552; 242/563.1, 615.1, 563, 529, 571.1, 571, 576.1, 563.2, 394

(56) References Cited

U.S. PATENT DOCUMENTS 3,863,857 A * 2/1975 Smith
4,111,378 A * 9/1978 Barwick
4,135,677 A * 1/1979 Warczak
4,620,184 A * 10/1986 Nedstedt
4,690,720 A 9/1987 Mack
5,021,110 A 6/1991 Kobayashi
5,660,663 A * 8/1997 Chamberlain et al.
5,867,102 A * 2/1999 Souder et al.
6,019,865 A * 2/2000 Palmer et al.

FOREIGN PATENT DOCUMENTS

| | | | |
|---|---|---|---|
| EP | 682 333 | | 11/1995 |
| WO | WO 93/25169 | | 12/1993 |
| WO | WO 96/27177 | | 9/1996 |
| WO | WO 97/14126 | | 4/1997 |
| WO | 97/14126 | * | 4/1997 |

* cited by examiner

*Primary Examiner*—Curtis Mayes
(74) *Attorney, Agent, or Firm*—Cohen, Pontani, Lieberman & Pavane

(57) ABSTRACT

The invention relates to a device for producing a strip with self-adhesive labels (12) or other materials with parts (22) placed underneath. According to the invention, the labels are detached from a first carrier strip (11) at a first removal station (13) and placed onto a second carrier strip (14). The other parts (22) are delivered intermittently on a third carrier strip (21). A second removal station (23) detaches said other parts and placed them on a fourth carrier strip (24) in the desired position. Said fourth carrier strip may act as the second carrier strip (14). The original carrier strip (11) may also act as the second or fourth carrier strip. The other parts (22) can be placed in any position under the labels (12) using an appropriate control system.

19 Claims, 7 Drawing Sheets

FIG.3
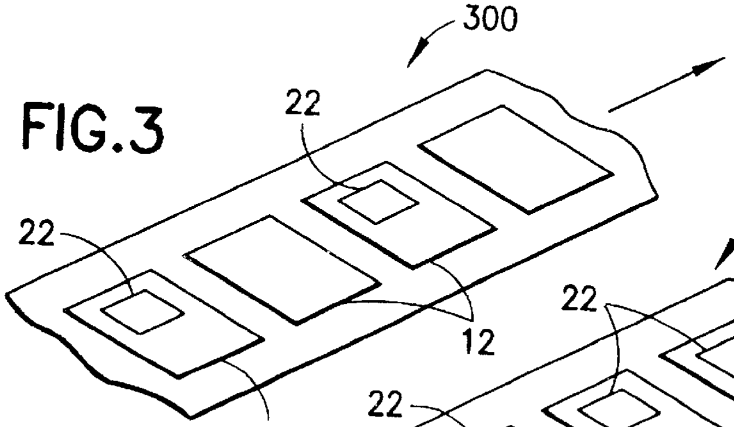
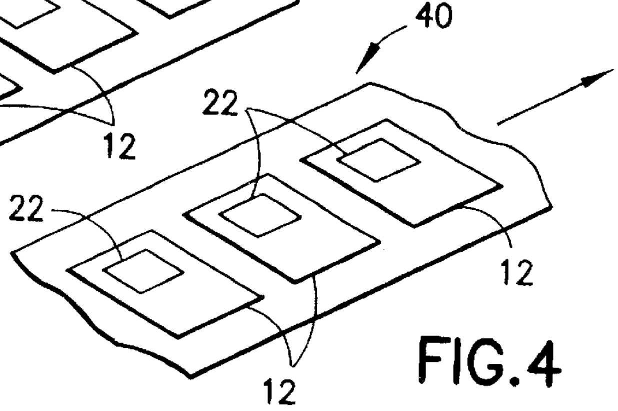
FIG.4
FIG.5
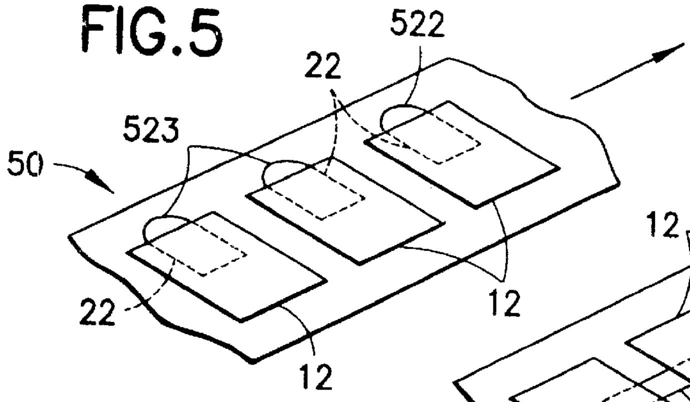
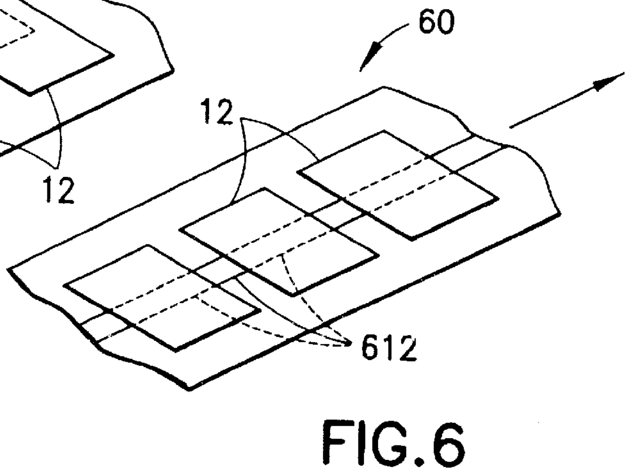
FIG.6

DEVICE FOR PRODUCING A STRIP WITH SELF-ADHESIVE LABELS OR OTHER MATERIALS WITH PARTS PLACED UNDERNEATH AND A DEVICE FOR LATERALLY GUIDING EDGES

This is a continuation application under 35 USC 111 and 37 CFR 1.53 of International PCT application No. PCT/DE98/01602 which was filed on Jun. 13, 1998, published as publication No. WO 99/00784 on Jan. 7, 1999, and claims from German priority applications 197 25 276.1 filed Jun. 14, 1997 and 197 58 449.7 filed Jun. 14, 1997.

BACKGROUND

1. Field of the Invention

The invention relates to an appliance for manufacturing a strip with self-adhesive labels or other materials with parts placed underneath, in particular a label strip on which removable, self-adhesive labels are applied to a carrier strip, on which carrier strip other parts, such in particular as security elements, are provided under the actual label. The other parts, when the self-adhesive label is detached from the carrier strip, can be transferred together with the latter onto an object to be provided with the label.

2. Description of the Prior Art

Self-adhesive labels are produced in known manner in such a way that individual labels are punched out from a label material, which is carried by a strip-shaped carrier and releasably adheres to the latter, by punching out to the desired shape and size by a suitable punching tool. After the removal of the label material residue which is not required, i.e. after the so-called waste or surplus removal, the carrier with the self-adhesive labels adhering to it is wound up to form a label spool. The latter is later inserted into a label dispenser by means of which the released labels are transmitted to an object or article which has to be labeled.

In practice, there is also a great desire to place accurately, under such self-adhesive labels and in one operation, other parts which can be transferred to or pasted onto the object to be labeled with the self-adhesive label.

A method known from European reference EP 0 682 333 A1 for the production of a self-adhesive label strip in which a top layer and electromagnetically active or activable security elements are joined together provides for the security elements to be bonded to a security element carrier strip and for the security elements to be separated from the security element carrier strip at a dispenser edge and be laminated together with the top layer. In this publication, no appliance information is provided from which it may be seen how this method is realized or can be realized in practice. Although general information is provided, its practical achievement is neither given nor even indicated.

SUMMARY OF THE INVENTION

The object of the present invention is to provide an appliance by means of which various materials, such as metal, plastics, paper, cardboard, composites or the like, which are located on a carrier strip in the form of punched labels or a continuous strip, are transferred in turn to a delaminated strip (and, in fact, either above it or below it) substantially continuously, at high speed, with good precision and a high level of flexibility during a rotational motion.

ADVANTAGES OF THE INVENTION

The appliance according to the invention for producing a label strip or the like with parts placed underneath achieves this object. As compared with the prior art and the method of producing a security label strip described at the beginning, it has the advantage of a practical machine, actually built and functional, by means of which parts, such as security elements, are placed under self-adhesive labels, in particular, during a rotational motion, substantially continuously, with high speed, great precision and at a high level of flexibility. This makes available a finished label strip from which the individual labels, with the other part placed underneath, can be transferred in one operation to the object to be furnished.

In accordance with the invention, this is achieved in principle by an appliance wherein a first supply spool, with associated transport device, is provided from which a first carrier strip with labels is unrolled. A first removal station is provided at which the labels from this first carrier strip are released and, after forward transport over a region which is free from the carrier strip, are deposited on a second carrier strip. A first winding spool, with associated transport device, is provided on which the first carrier strip is wound. A second supply spool, with associated transport device, is provided from which is unrolled a third carrier strip with other parts, which are applied to it and which have to be arranged under the label. A second removal station is provided at which the other parts are released from this third carrier strip and, after forward transport over a region which is free from carrier strip, are deposited on a fourth carrier strip. A second winding spool, with associated transport device, is provided on which the third carrier strip is wound. A controlled intermittent drive for the third carrier strip, with the other parts on it, is provided by means of which this third carrier strip is guided locally, fed forward in a controlled manner and inter-mittently driven in such a way that the other parts can be deposited on the fourth carrier strip at desired position. A third winding spool, with associated transport device, is provided on which the second carrier strip can be wound, the winding speed corresponding approximately to the unwinding speed with which the first carrier strip is unwound from the first supply spool. The fourth carrier strip furnished with the deposited parts can function as the second carrier strip on which the labels released at the first removal station are deposited accurately with respect to location and time at the desired position and, by this means, cover the other parts completely or partially.

Thus, in accordance with an advantageous and very expedient embodiment of the invention, the first carrier strip from which the self-adhesive labels are removed at the first removal station is used as the second carrier strip or the fourth carrier strip on which the other parts and subsequently the labels are deposited, a corresponding, suitable guide and feed system for the first carrier strip being provided. In this embodiment of the appliance according to the invention, the labels are released from the carrier strip and are later deposited back on the same carrier strip, the other part, for example a security element, having been previously applied to this carrier strip and this other part being then accurately covered by the label at the desired position.

Both together, i.e. label and other part placed underneath, are then jointly transferred to the object to be labeled during the final application of the label strip, i.e. during the labeling of objects. This also has the particular advantage in the case of the labeling of glass bottles, during the removal of the label, that the security element has to be removed jointly with it, for example, because the adhesion effect between the security element and the label is greater than that between the label, with the security element, and the glass bottle. This has previously been a particular problem in practice because the security elements were placed on the glass bottles in a separate labeling procedure and the labels covering them were then applied in a second separate labeling procedure using additional equipment. In this arrangement, accurate placing is fundamentally problematical, on the one hand, and, on the other, it has been found in practice that because of the different adherence behavior, it is scarcely possible to remove both parts jointly from the glass bottle.

In accordance with a further particularly expedient embodiment of the invention, the second removal station is arranged substantially at right angles to the first removal station. For both functional and space reasons, this has shown itself to be a very beneficial arrangement.

In accordance with a further particularly expedient embodiment of the invention, web edge controls are provided for the carrier strips for the lateral open-chain and closed-loop control of the strip guidance. Because of these web edge controls, the carrier strips are individually and securely guided and retained on their transport path in their desired direction and, on the other hand, a very expedient appliance is provided by means of which the carrier strips can be aligned side by side. This quite substantially increases the flexibility and the accuracy during the placing and mutual arrangement of labels and the other parts to be placed underneath or above them.

In accordance with a particularly advantageous embodiment of the invention, for each carrier strip, a respective electric motor, which can be steplessly controlled, particularly by potentiometer, is provided for the traction and the retardation of the respective carrier strip. By means of this embodiment, the machine is made very flexible and adaptable to different task profiles with respect to the working speed, accuracy and possibilities of application. This embodiment is further improved in a particularly expedient manner if a central servomotor with programmable frequency converter is provided for the coordinated driving and retarding procedure of all transport devices. Depending on the use to which the machine is put, various motors—with the possible provision of different speeds and directions for the various carrier strips—can be provided. Various master motors can then be employed.

In a further advantageous embodiment of the invention, a detection circuit for faulty labels is provided, preferably for each individual carrier strip furnished with labels or other parts. As an improvement or alternative to this, an inspection appliance is expediently provided for detecting cracks in the carrier strip, preferably for each individual carrier strip furnished with labels or other parts.

In accordance with a further very advantageous embodiment of the invention, expanding shafts are provided to and from which air can be automatically supplied and extracted and on which the supply spools and winding spools are secured. These expanding shafts, which rotationally secure the spools on their hub, can have different diameters to suit the internal hub diameters occurring, for example 40 mm or 3"diameter. The expanding shafts can also be simply exchanged by means of a suitable closing feature which temporarily closes the air duct. This is of decisive advantage for handling in day-to-day practice.

A further advantageous embodiment of the invention, which is essential for the carrier strip for the other parts, which are advanced intermittently in a different cycle, for example in a lower rate cycle, is provided in particular by an adjustable detection circuit provided for the spool end of the carrier strip for the other parts, which detection circuit reports detection of the end of the spool in particular by a flashing light.

In accordance with a particularly advantageous embodiment of the appliance according to the invention, holding and drive rollers, so-called "stop-and-go" rollers, are provided for the intermittent forward feed of the third carrier strip with the other parts on it. In a particularly expedient development of this embodiment, the holding and drive rollers, the so-called "stop-and-go" rollers, are manufactured from a special rubber. This ensures a gentle manner of operation which protects the material and the carrier strip. By using different hardnesses for the rubber, different hardnesses and thicknesses of the other parts can be taken into account and compensated for in a flexible manner. This also substantially contributes, on the one hand, to gentler and more rapid machine running and therefore to an increased working cycle and also, on the other hand, to increasing the usability of the machine. To further improve this embodiment, an advantageous development of the invention provides for it to be possible for the holding and drive rollers to be exchanged and/or to be automatically and/or pneumatically adjusted.

In accordance with a further particularly advantageous embodiment of the appliance according to the invention, a special quick-action clutch is provided by means of which the holding and drive rollers, the so-called "stop-and-go" rollers, are connected to the drive motor and are disconnected from the latter. This embodiment further increases the working speed.

In an advantageous manner, the appliance configured in accordance with the invention can be very flexibly employed. Thus, in accordance with a particularly expedient embodiment, security elements can be placed as the other parts under the labels, it being possible to excite the security elements electromagnetically or acoustically or by radio frequencies, for example. Thus, by means of the present invention, a substantial goods security simplification is achieved which consists, in particular, in the security elements having already been placed—in a simple and low-cost manner—under the labels to be pasted, it being possible to deliver strips in spool form to the labeling positions. The objects can there be both made secure and labeled in a simple procedure by transferring the combined label to the object. If this has already been undertaken during the manufacture or filling of the goods or objects, i.e. at the source of a sequence of goods, a substantial condition is created for the so-called source security.

As already mentioned, the appliance configured in accordance with the invention can be employed very flexibly in an advantageous manner. Thus, in accordance with a particularly expedient alternative embodiment, sales tabs or instruction tabs or handling loops or similar parts can be placed as the other parts under the labels or stickers in such a way that interesting parts protrude from under the label.

To further increase the flexibility of the appliance configured according to the invention, provision is made according to a further advantageous embodiment for the control system to be provided with a microcontroller and for different placements to be carried out, in particular for another part to be placed under each label or sticker or only under each second, third, seventh or under each second, fifth, ninth label or sticker. This makes possible an advantageous sequence of labels or stickers different from that given.

In an advantageous embodiment of the invention, sensors are provided at various positions on the transport paths of the various carrier strips, by means of which sensors the control system generates corresponding position signals for the cyclically correct placing of the other parts in the correct position on the fourth carrier strip, for the operation at the correct time of the holding and drive rollers, the "stop-and-go" rollers, in order to feed the third carrier strip with the other parts forward intermittently and to detect, set and control the various speeds of the individual carrier strips.

As already emphasized several times, the appliance according to the invention is very flexible and can be employed in many ways. In accordance with a further advantageous embodiment, provision is made wherein the other parts to be placed are deposited on the fourth carrier strip in such a way that their adhesive sides come together or are laminated together with the adhesive side of the label or sticker covering them, a detachable label or detachable sticker with an adhesive-free zone being formed by this means. This is a feature which is very much in demand in many applications in the labeling, packing and garment industries.

In accordance with a particularly advantageous and expedient development of this embodiment of the invention, there is provision wherein the second removal station is arranged in the immediate vicinity of the first removal station and is inclined in the transport direction of the labels released from the first carrier web in such a way that the other parts released from the third carrier web by the second removal station come to rest with their adhesive side directly on the adhesive side of the label transported over the top and released immediately before from the first carrier web by the first removal station, the two adhesive surfaces including an acute angle between them and the two subsequently being jointly deposited and pressed onto the second carrier strip, the side of the other part not provided with adhesive coming to rest directly on the second carrier strip or the fourth carrier strip.

The appliance according to the invention can process not only labels but also other materials to produce strip webs with other parts underneath but, in advantageous and expedient embodiments, can also provide, instead of self-adhesive labels or stickers under which other parts are placed, cardboard strips or strips of plastic or other materials or parts already punched into shape and arranged on a carrier strip, under which other parts are placed by means of the appliance according to the invention. It is also possible to process endless webs between which other parts are inserted and laminated. It is then, for example, possible to conceive the production by rotational means of laminated credit cards, chip cards or the like.

As mentioned further above, the use of a web edge control is provided as a particular development.

The object of the present invention with respect to the web edge control is to provide an appliance by means of which the known web edge control can also be applied for diffuse edge contours and for strips whose edge cannot be detected directly or only with particular difficulty because of the particularly small web width. This appliance should be simple in design, functionally reliable and of low cost.

ADVANTAGES OF THE WEB EDGE CONTROL ACCORDING TO THE INVENTION

The appliance according to the invention for the lateral open-chain and closed-loop control of the guidance of webs and strips, achieves this object. As compared with the prior art, it has the advantage of the simple and low-cost provision of an appliance by means of which the web edge control does not involve control difficulties despite diffuse edge contours.

In accordance with the invention, this is achieved in principle by a slot guide being provided in which the web is guided, the slot guide is provided with a straight edge which supplies the sensor with a reference edge for web edge detection, the slot guide is arranged in the region of the sensor and the slot guide has easy-running guidance and floats with the laterally controlled web.

Thus an advantageous and very expedient embodiment of the invention is provided wherein one side edge of the web is in contact with a first lateral stop of the slot guide and its opposite side edge is in contact with a second lateral stop at a distance corresponding to the web width, little clearance being provided between the web and the lateral stops. This clearance between the web and the lateral stops can reach 2/10 mm for example. In an advantageous development, the two lateral stops can be adjusted relative to one another to suit the web width. In a particularly expedient embodiment, the slot guide has a base part and a cover part covering it and the web resting on it.

A further very advantageous embodiment of the invention is one wherein the slot guide is supported on rollers and wherein the rollers slide on a guide which is arranged transverse to the transport direction of the web and, viewed in the transport direction, is arranged before the sensor. This ensures reliable and very easy movement or floating of the slot guide with the laterally controlled web. In further expedient embodiments of the invention, the slot guide consists of light-weight material, in particular aluminum.

In accordance with a preferred embodiment, provision is made wherein the slot guide has a web guide length in the transport direction of the web which at least corresponds to the length between two protruding regions with larger web width. This ensures reliable guidance of webs with diffuse edges.

In a particularly very advantageous development of the invention, provision is made wherein at least one further slot guide is provided near the first slot guide and is firmly connected to it so that at least one further web is transported near the first and can be laterally controlled at a constant distance from the first and from the common reference edge.

In a very advantageous manner, the arrangement according to the invention is used for the web edge control of webs which have diffuse or undulating edges or edges provided with protrusions and recesses. An alternative use, which avoids other problems of edge detection, is one wherein the slot guide according to the invention is used for the web edge control of one or a plurality of particularly narrow strips, in particular metal strips such as security strips for bank notes.

DESCRIPTION OF THE DRAWINGS

The invention is explained in more detail using embodiment examples of the appliance according to the invention shown in the drawings and using various applications in the following description. In detail

FIG. 3 shows, diagrammatically, a first application example for a label strip in which another part is placed under each second label;

FIG. 4 shows, diagrammatically, a second application example for a label strip in which another part is placed under each label;

FIG. 5 shows, diagrammatically, a third application example for a label strip in which another part is placed under each label, a part of which other part emerges laterally from under the label, for example a handling loop;

FIG. 6 shows, diagrammatically, a fourth application example of a label strip in which, under each label, is placed another part in the form of a continuous strip, an endless tape, for example a magnetic tape for use in special cash points and multi-story car parks;

DESCRIPTION OF THE PREFERRED EMBODIMENT AND APPLICATION EXAMPLES

Figure 1:
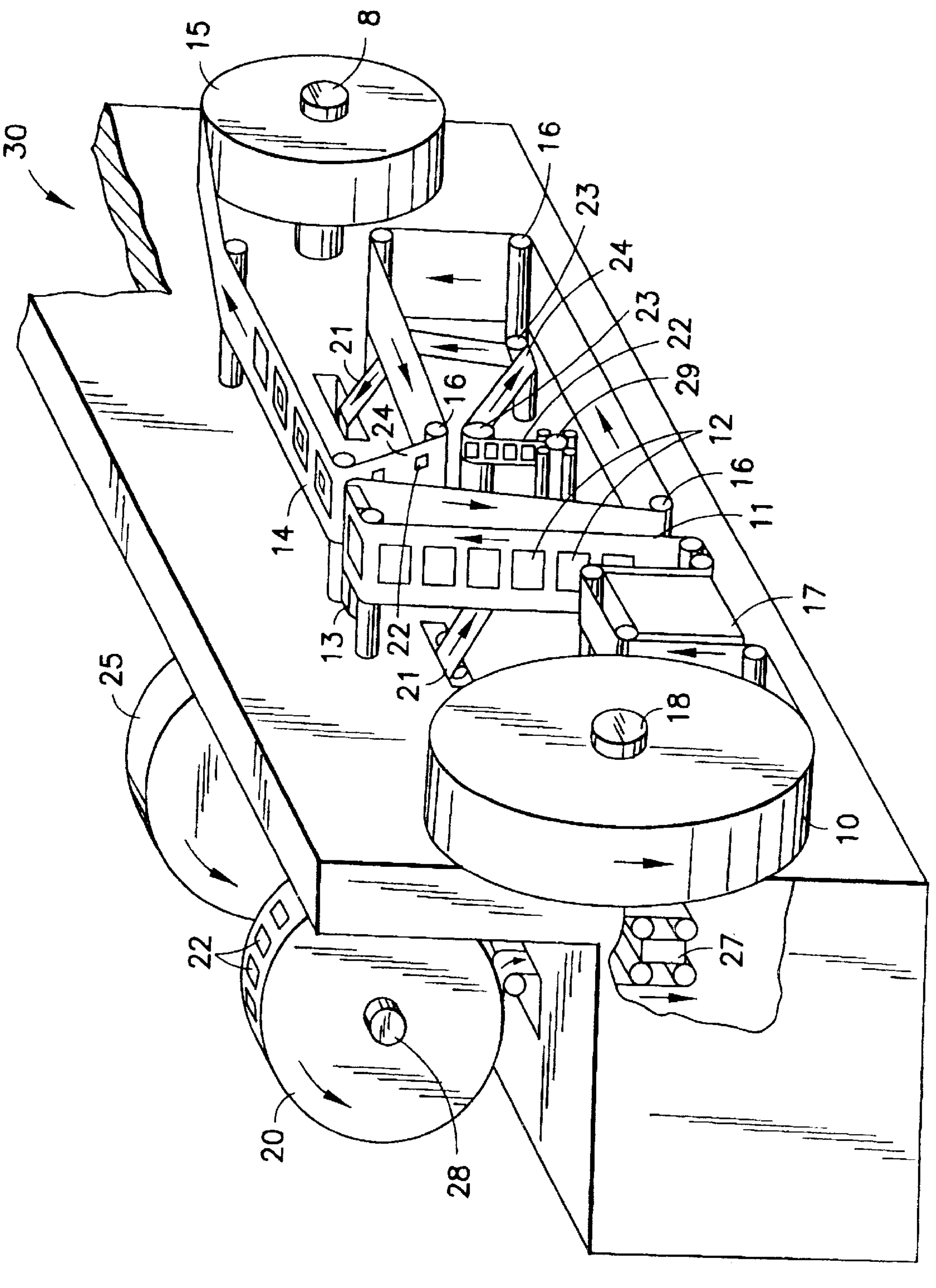
FIG. 1 shows, in diagrammatical three-dimensional representation, a first embodiment according to the invention for producing a label strip.

A first embodiment of the appliance according to the invention for the production of a label strip is shown in FIG. 1 in three-dimensional diagrammatic representation. The expression "label" is used throughout in the following description. This expression "label", however, is to be understood not only as the actual label but also things such as stickers or the like. These things can, therefore, be printed or unprinted. They can consist of various materials, such in particular as paper, cardboard strips or strips of plastic or other materials. They can already be in the form of punched parts, with the surplus removed, arranged on a carrier strip or they can also be strip-shaped parts. The variation possibilities are very numerous. An essential feature of the labels is that they are self-adhesive and applied to a carrier strip before they are supplied for their actual purpose, the labeling of objects or goods or the transfer to an object.

In the appliance configured according to the invention, a first supply spool 10, with associated transport device, is provided from which a first carrier strip 11 with labels 12 is unwound. A first removal station 13 is provided at which the labels 12 are released from this first carrier strip 11 and, after being transported or fed over a region which is free of carrier strip, are deposited on a second carrier strip 14. A first winding spool 15 with associated transport device is provided on which the first carrier strip 11 is wound. In addition, a second supply spool 20 with associated transport device is provided from which a third carrier strip 21, with other parts 22 applied to it and which have to be arranged under the label 12, is unwound. A second removal station 23 is provided and the other parts 22 are released from this third carrier strip 21 at this second removal station 23 and, after being transported or fed over a region which is free from carrier strip, they are deposited on a fourth carrier strip 24. A second winding spool 25 with associated transport device is provided on which the third carrier strip 21 is wound. A controlled intermittent drive of the third carrier strip 21 with the other parts 22 on it is provided and by means of it, the third carrier strip 21 is locally guided, fed forward in a controlled manner and intermittently driven in such a way that the other parts 22 are deposited at the desired position on the fourth carrier strip 24. In addition, a third winding spool 15 with associated transport device is provided on which the second carrier strip 14 can be wound, the winding speed corresponding approximately to the unwinding speed with which the first carrier strip 11 is unwound from the first supply spool 10. The fourth carrier strip 24 furnished with the deposited other parts 22 can function as the second carrier strip 14 on which the labels 12 detached at the first removal station 13 are deposited at the desired position accurately with respect to location and cycle and therefore cover the other parts 12 completely or partially.

No separate fourth carrier strip 24 is provided in the embodiment example shown in FIG. 1. In addition, no separate second carrier strip 14 is provided either in the embodiment example shown. In a very expedient embodiment, the first carrier strip 11, from which the self-adhesive labels 12 are removed at the first removal station 13, is in fact used as the second carrier strip 14 on which the other parts 22 are first deposited in the removal station 23 and, subsequently, the labels 12. A corresponding and suitable guide and supply system for the first carrier strip 11 is provided. In the embodiment example shown, this leads from the supply spool 10 via the first removal station 13 and, by means of correspondingly arranged deflection rollers 16, in turn around the second removal station 23 as far as a region free of carrier strip back to the first removal station 13 and from there, designated as carrier strip 14, to the winding spool 15.

Depending on the requirement, therefore, up to four carrier strips can be used in the appliance according to the invention. The first carrier strip 11 carries the labels 12 as far as the removal station 13 and is then wound onto a separate winding spool and can be removed. The second carrier strip 14 takes over the released labels 12 at the first removal station 13. It is supplied by a supply spool (not shown in FIG. 1) and is wound onto a winding spool which is designated by 15 in FIG. 1. The third carrier strip 21 is furnished with the other parts 22, is unwound from the supply spool 20, guides the other parts 22 to the second removal station 23 and is then wound empty onto the winding spool 25 and can be removed. The fourth carrier strip 24 can be supplied by a separate supply spool (not shown in FIG. 1). It takes over the other parts 22 released at the second removal station 23 and unites these with the under-surface of the labels 12 on the second carrier strip 14. The use of a separate fourth carrier strip 24 is certainly of advantage when the other parts 22 and the labels 12 also have to be covered by a layer from underneath. This can, for example, be the case in the production of laminates such as credit cards or the like. If the second carrier strip 14 is used as the fourth carrier strip 24 and, for this purpose, is guided past the second removal station 23 to take over the other parts 22, the separate fourth carrier strip is then omitted and the second carrier strip 14 functions as the fourth carrier strip 24. The use of such a separate carrier strip 14–24 by the appliance according to the invention simplifies the appliance. It also offers the advantage that a special carrier strip with desired properties can be provided for the acceptance of the finished labels 12 with parts 22 placed underneath. In the case such as is shown in the embodiment example of FIG. 1, the carrier strip 11 is used again for accepting the finished labels 12 with the parts placed underneath and therefore acts both as the second carrier strip 14 and as the carrier strip 24. After the removal of the other parts 22 from the third carrier strip 21, therefore, only the latter has to be removed. As may be seen from this representation, a plurality of possibilities is provided by the invention.

Figure 2:
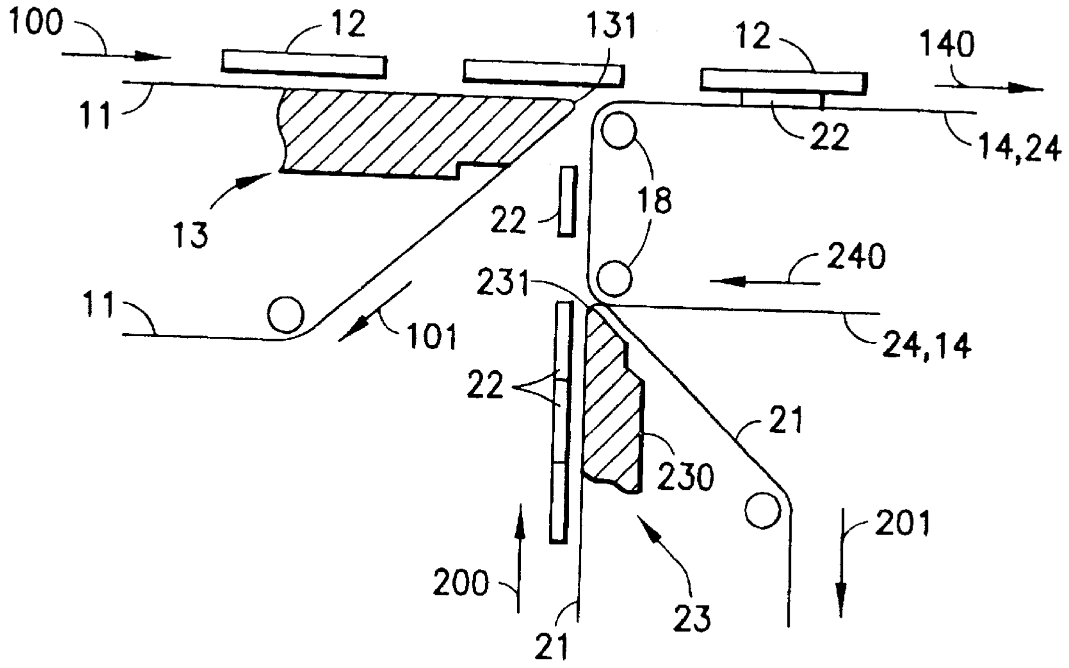
FIG. 2 shows, diagrammatically, a representation of the first and second removal stations and their relationship in accordance with the present invention.

As shown in FIG. 1 and FIG. 2, the second removal station 23 is arranged substantially at right angles to the first removal station 13. This agrees with the transport directions of the first carrier strip 11 and the third carrier strip 21 which are essential during the supply of labels 12 and the other parts 22 in the region immediately before the respective removal.

As shown in FIG. 1, the carrier strips 11 and 21 are each provided with a web edge control system 17 or 27. By this means, the lateral positions of the carrier strips are determined per se and in relation to one another and are directed into the set position during the course of the strip guidance. A steplessly controllable electric motor, controllable in particular by means of potentiometer, is respectively provided for each carrier strip 11 or 21 for the traction and the retardation of the respective carrier strip. These motors are not shown in the figures. In addition, a central servomotor with programmable frequency converter (likewise not shown in the figures) is provided for the coordinated driving and retarding procedure of all transport devices. This permits a very flexible configuration of drive profiles by means of which the most varied tasks can be mastered. Depending on the use to which the machine is put, different motors can be provided with the possible specification of different speeds and directions for the various carrier strips. Different master motors can then be employed so that they can drive at different speeds.

In a further embodiment, the appliance configured in accordance with the invention contains a detection circuit (not, however, shown in detail in the figures) for faulty labels, preferably for each individual carrier strip 11 or 21 furnished with labels 12 or other parts 22, and a control appliance for detecting cracks in the carrier strip, preferably for each individual carrier strip 11 or 21 furnished with labels 12 or other parts 22. In order to complete the operating convenience of the machine, an adjustable detection circuit for the spool end of the carrier strip 21 for the other parts 22 is provided which, in particular, reports detection by flashing light.

The first supply spool 10 shown in FIG. 1 and the first and third winding spools 15 for the carrier strip 11 are secured on expanding shafts 18. In the same way, the supply spool 20 and the second winding spool 25 are secured on expanding shafts 28. Air can be automatically supplied to and extracted from these expanding shafts 18 and 28, i.e. when the hubs of the supply spools 10 and 20 or the hubs of the winding spools 15 and 25 are pushed onto the expanding shafts 18 and 28 during a change of spool, the expanding shafts expand to secure the hubs when compressed air is supplied. Before the removal of the spools from the expanding shafts 18 and 28, air is extracted from the latter, their diameter shrinks and the hubs can be removed. The expanding shafts can have different diameters to suit the hub diameters generally employed, of for example, 40 mm or 3" (three inches) and can be simply exchanged. The air supply is automatically blocked off during removal and is opened again after the spool has been successfully placed in position. Bayonet connections can be employed for easy exchange of expanding shafts of different sizes.

Holding and drive rollers, so-called "stop-and-go" rollers, are provided for the intermittent forward feed of the carrier strip 21 with the other parts 22 on it, i.e. the third carrier strip. In the representation of the embodiment example shown in FIG. 1, a roller 29 is shown which is arranged before the second removal station 23, viewed in the transport direction. The associated other roller 29 is not visible. In the embodiment example shown, supply spool 20 and winding spool 25 for the third carrier strip 21 are arranged at right angles to the supply spool 10 and the winding spool 15 for the first carrier strip 11. The carrier strip 21 penetrates a support wall 30 by which a major proportion of the transport devices is held and is deflected by means of 45° deflection rollers 26 into the direction appropriate to the carrier strips 11, 14, 24 and is guided back again to the winding spool 25. It is clear that an arrangement of all the supply and winding spools in one single plane is possible.

The other parts 22 to be placed under the labels 12 can involve different parts which have different thicknesses and properties. This is reflected in the running behavior during operation. In order to ensure (as far as possible) optimum intermittent forward feed, the holding and drive rollers 29 are produced from a special rubber, in accordance with a further expedient embodiment of the invention. In addition, the holding and drive rollers 29 can be exchanged and/or can be automatically and/or pneumatically adjusted. In addition, a special quick-action clutch is provided (which is not shown in the figures) by means of which the holding and drive rollers 29 are connected to the drive motor and are disconnected from the latter. This ensures a particularly rapid sequence of intermittent forward feeds of the third carrier strip 21 with the other parts 22.

A representation of the first removal station 13 and the second removal station 23 and of their relationship and their functions in accordance with the present invention is shown simplified and diagrammatically in FIG. 2. The removal stations 13 and 23 consist essentially of a wedge-shaped guide part 130 or 230 with an acute-angled deflection edge 131 or 231 at the tip. These can also be referred to as the dispensing edges. At the removal station 13, the first carrier strip 11 with the labels 12 on it is transported in the direction of the arrow 100 onto the deflection edge 131 and then, after release of the labels 12, is transported away in the direction of the arrow 101. In a comparable manner, the third carrier strip 21 with the other parts 22 arranged tightly on it, is transported in the direction of the arrow 200 onto the deflection edge 231 and then, after the release of the other part 22, is transported away in the direction of the arrow 201. The motion of the carrier strip 11 takes place continuously whereas the motion of the carrier strip 21 takes place intermittently in steps which correspond approximately to the length of the other parts. The motion interval determines the distance apart of the other parts 22 transferred to the carrier strip 24, 14. The fourth carrier strip 24, with the respective individual other part 22 on it, continues to run approximately at right angles onto the plane of the path of movement corresponding to the arrows 100 and 140 in which the first carrier strip 11 moves as far as the deflection edge 131 and the second or fourth carrier strip 14 or 24 then moves to the right from the upper deflection roller 16. The right-hand label 12 already covers another part 22 whereas the central label 12 is still located over the region free of carrier strip and the next other part 12 is on the carrier strip 24 before the upper deflection roller 16. The region free from carrier strip in the first removal station 13 is provided between the deflection edge 131 and the upper deflection roller 16. The region free from carrier strip at the second removal station 23 is provided between the deflection edge 231 and the lower deflection roller 16. In each case, this region is made shorter than that corresponding to the length, viewed in the transport direction 100 or 200, of the labels 12 or other parts 22 bridging over it.

By means of the appliance configured according to the invention, security elements can be placed under the labels 12 as the other parts 22, the security elements being excitable electromagnetically or acoustically or by radio frequencies. Sales tabs or instruction tabs or handling loops or similar parts can also be placed under the labels 12 as the other parts 22 in such a way that interesting parts protrude from under the label 12. In order to be able to control this in an advantageous manner, the control system is provided with a microcontroller in the embodiment of the invention. By means of this, different placements can be carried out. In particular, another part 22 can be placed under each or only under each second, third, seventh or under each second, fifth, ninth label or sticker. A different advantageous sequence of labels or stickers can be selected by means of the control system.

A first application example for the appliance according to the invention is shown in FIG. 3. In the finished label strip 300 shown, another part 22 is placed under each second label 12. In the further application example shown in FIG. 4 of a finished label strip 40, another part 22 is placed under each label 12. The other parts 22 shown in these two application examples are completely covered by the labels 12 arranged above them.

FIG. 5 shows, diagrammatically, a third application example of a finished label strip 50 in which another part 22 is placed under each label 12, a part 522, for example a handling loop, of the other part 22 protruding laterally from under the label. Instead of a handling loop, the protruding parts 522 could also be sales or instruction tabs.

FIG. 6 shows, diagrammatically, a fourth application example of a finished label strip 60 in which another part in the form of a continuous strip 612, an endless tape (for example a magnetic tape for use in special cash points and multi-story car parks), is placed under each label 12. A metal strip in the form of a cord, a fiber of a cable or a thin narrow foil can also be used instead of the magnetic tape or strip 612. It is possible to apply this metal tape endlessly or in parts. As an example, it can be supplied endlessly to the third carrier strip 21, be separated into individual sections by cutting and these cut-off parts can be placed intermittently under the labels 12. A further variant consists in making the individual section of the metal thread of just sufficient length so that no end protrudes from under the finished label 12 (this could make it possible to pull out the thread). The arrangement of such a section can take place transverse to or in the longitudinal direction of the label strip 60.

In the machine configured in accordance with the invention, sensors are provided at various positions of the transport paths of the various carrier strips 11, 14, 21 and 24. By means of these sensors, the control system generates corresponding position signals for the cyclically correct placing of the other parts 22 in the correct position on the fourth carrier strip 24 or 14 or 11 for the operation at the correct time of the holding and drive rollers 29, the so-called "stop-and-go" rollers, in order to feed the third carrier strip 21 with the other parts 22 forward intermittently and to detect, set and control the various speeds of the individual carrier strips. These sensors, like the control system, are not shown in detail in the FIGURES.

Figure 7:
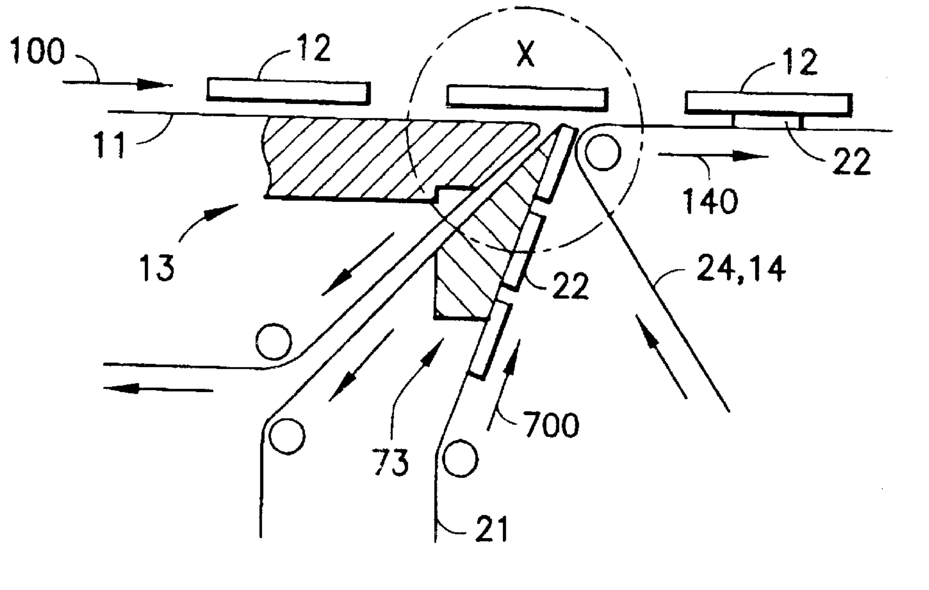
FIG. 7 shows, diagrammatically, a representation of a second essential embodiment of the appliance according to the invention with the first and second removal stations and their particular relationship for the production of labels, with adhesive-free zones, in which the adhesive side of the other parts come to rest directly on the adhesive side of the label.
Figure 8:
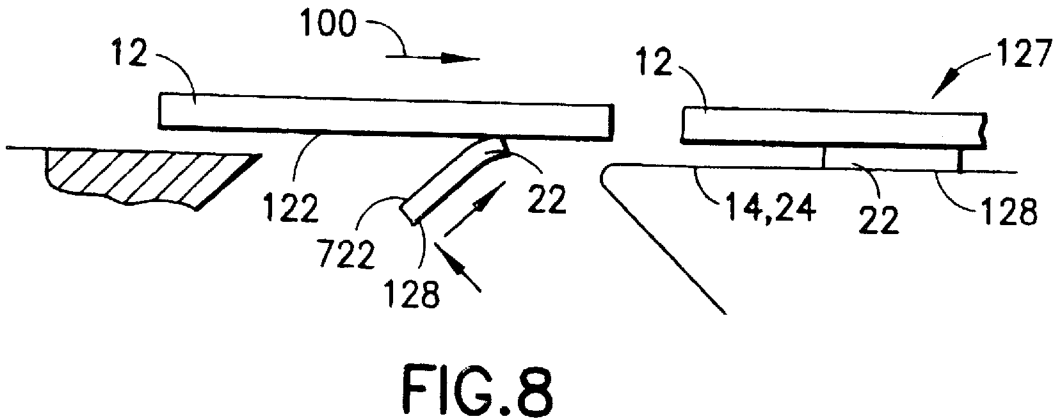
FIG. 8 shows, diagrammatically in enlarged representation, label and other part for the production of the adhesive-free zone.

In accordance with a second very advantageous embodiment example, which is diagrammatically shown in FIG. 7 and the enlarged detail representation of FIG. 8, a strip with self-adhesive labels or with self-adhesive stickers, which have an adhesive-free zone, can be produced in a simple manner by means of the invention. For this purpose and in accordance with this embodiment, the other parts 22 to be placed are deposited on the fourth carrier strip 24 in such a way that their adhesive sides 722 come together or are laminated together with the adhesive side 122 of the label 12 covering them, a detachable label 127 with an adhesive-free zone 128 being formed by this means.

In order to produce a label 127 with an adhesive-free zone 128, the second removal station 73 is configured somewhat differently from the removal station 23 shown in FIG. 1. This removal station 73 is arranged in the immediate vicinity of the first removal station 13 and is inclined in the transport direction 100 of the labels 12 released by the first carrier web 11 in such a way that the other parts released from the third carrier web 21 by the second removal station 73 come to rest with their adhesive side 722 directly on the adhesive side 122 of the label 12 transported over the top and released immediately before from the first carrier web 11 by the first removal station 13, the two adhesive surfaces 122 and 722 including an acute angle between them and the two subsequently being jointly deposited and pressed onto the second carrier strip 14, the side 128 of the other part 22 not provided with adhesive coming to rest directly on the second carrier strip 14 or the fourth carrier strip 24. In the embodiment example shown, the supply directions 100 of the labels 12 and 700 of the other parts form an acute angle with one another located at 90°.

It also appears possible, during the transfer of the other part 22 released by the third carrier strip 21 to the fourth carrier strip 24, for this to be taken over and transported with a slightly adhesive surface until its adhesive surface 722 unites with the adhesive surface 127 and there adheres more firmly. The adhesive-free zone 128 must then, if necessary, be releasable from the fourth carrier strip 24.

Figure 9:
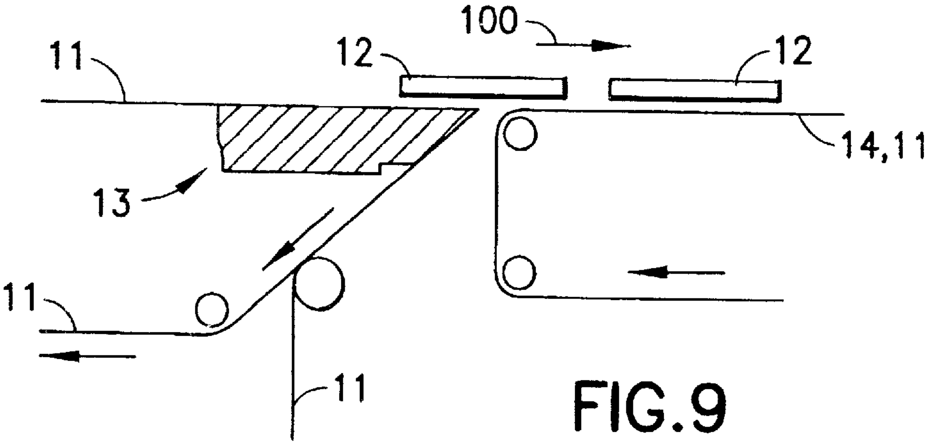
FIG. 9 shows, diagrammatically, a third essential embodiment of the appliance according to the invention with the first removal station and the removal and supply system of the first and second carrier strip, this embodiment being used for the transfer of the labels from the old to a new carrier strip or offset to the old carrier strip.

FIG. 9 shows, diagrammatically, a representation of a third essential embodiment of the appliance according to the invention, having the first removal station 13 and the removal and supply system for the first carrier strip 11 and the second carrier strip 14, this embodiment being used to transfer the labels 12 from the old carrier strip 11 onto a new carrier strip 14 or offset onto the old carrier strip 11. In this embodiment or application of the appliance configured according to the invention and completely represented diagrammatically in FIG. 1, the second removal station is not required for this use or this application. The intermittent forward feed of the third carrier strip 21 is omitted.

Figure 10:
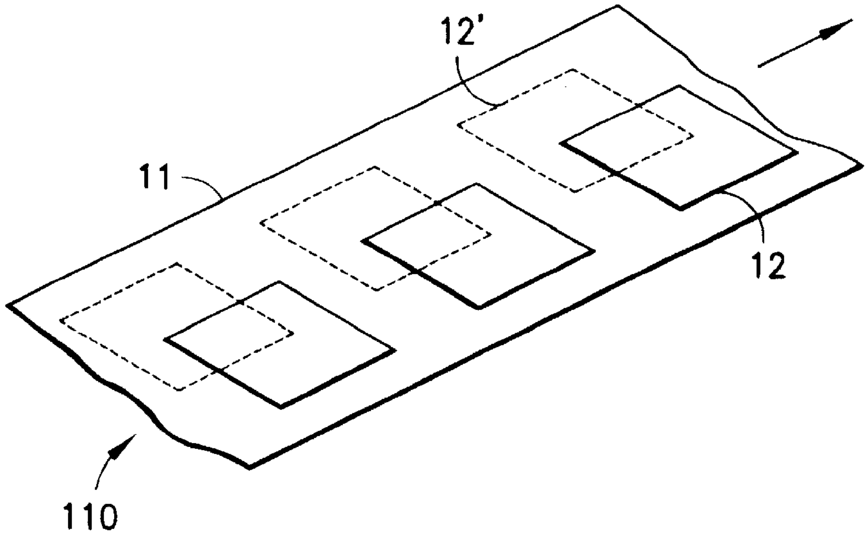
FIG. 10 shows, diagrammatically, an application example of a label strip in which each label, by means of the embodiment or mode of operation of the appliance according to the invention shown diagrammatically in FIG. 9, is released from the first carrier strip and is deposited again on the same carrier strip offset in the lateral direction and also in the longitudinal direction.

FIG. 10 shows, diagrammatically, an application example of a label strip 110 in which each label 12 is released, by means of the embodiment or mode of operation of the appliance according to the invention shown diagrammatically in FIG. 9, from the first carrier strip 11 and from its original position shown by interrupted lines and designated by 12' and is deposited again offset in the lateral direction and in the longitudinal direction on the same carrier strip 11.

Figure 11:
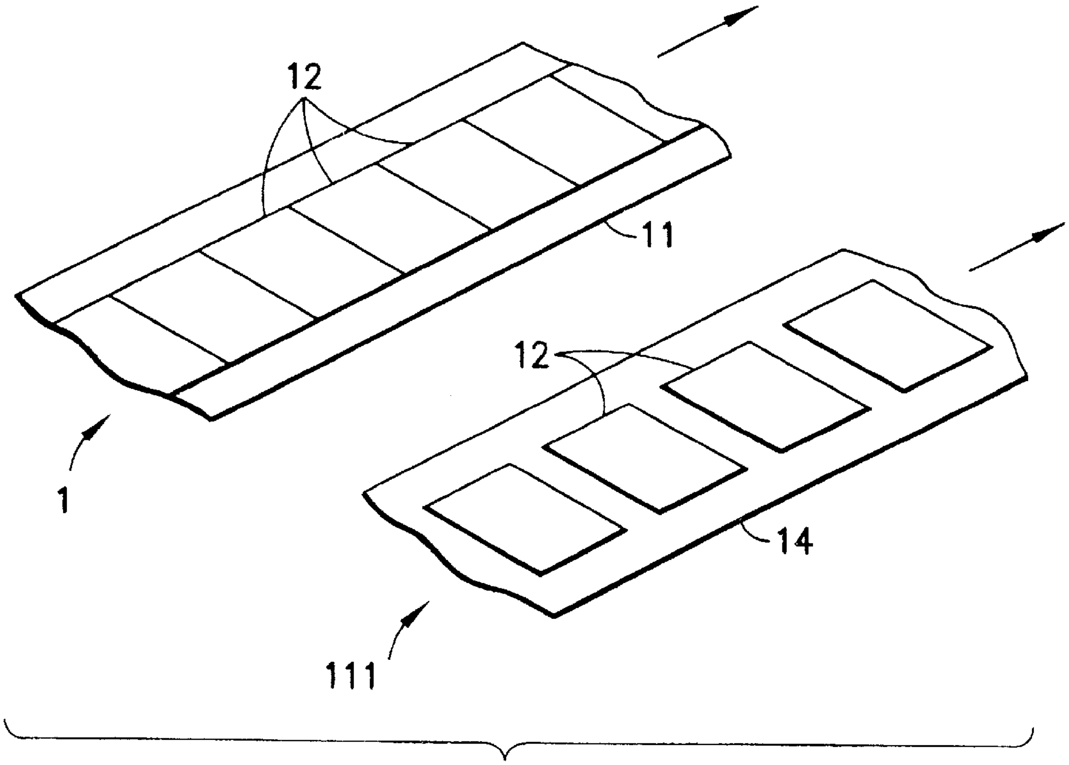
FIG. 11 shows, diagrammatically, a second application example for a label strip in which each originally abutting label (upper part of the figure) is released, by means of the embodiment or the mode of operation of the appliance according to the invention shown diagrammatically in FIG. 9, from the first carrier strip and is deposited again on the same carrier strip offset in the longitudinal direction (lower part of the figure) and, by this means, the distance between the labels is increased.

FIG. 11 shows, diagrammatically, a second application example of a label strip 111 in which each originally abutting label 12 is released from the first carrier strip 11, by means of the embodiment or mode of operation of the appliance according to the invention shown diagrammatically in FIG. 9, and deposited again offset in the longitudinal direction on the same carrier strip 11 or on a second carrier strip 14 with an increased distance between the labels 12. The original label strip 1 with the abutting labels 12 is shown in the upper part of FIG. 11 and the label strip 111 produced with the individual labels 12 is shown in the lower part of FIG. 11. The distance between the individual labels can be as low as 0.5 mm and can, of course, be larger.

Instead of labels under which other parts are placed, cardboard strips or strips of plastic or other materials can be processed by means of the present invention. It is also possible to use parts of these materials which have already been punched into shape and arranged on a carrier strip and to place other parts under them by means of the appliance. The possibilities of application are very numerous.

In an advantageous manner, the invention permits the simple production of strips or endless tapes with self-adhesive labels, stickers or the like applied to them, under which labels, stickers or the like or also on which are placed other parts which have to be transferred with the self-adhesive label onto the object to be labeled. Other advantageous embodiments and applications are possible and have, in part, been presented in the description above.

An appliance for the lateral open-chain and closed-loop control of the guidance of webs and strips is described below which, within the scope of the invention, is to be applied particularly advantageously and has been correspondingly configured in accordance with the invention in relation to the production of strips with labels.

This invention is based on an appliance for the lateral open-chain and closed-loop control of the guidance of webs and strips, in particular label webs and their carrier strips, the edge of the web being detected by a web edge control system by means of a sensor and the closed-loop control intervention taking place by means of direction change of control rollers over which the web is guided, in accordance with the generic type defined in the preamble to claim 22.

In a known web edge control system, such as is offered for example by the Erhardt and Leimer Company, D-86136 Augsburg, under the designation rotary frame DR 21, provision is made, for the lateral open-chain and closed-loop control of the guidance of webs, for the edge of the web to be detected by means of a sensor and the control intervention to be carried out by means of direction change of control rollers over which the web is guided. The control rollers are arranged on a rotary frame which is controlled by a motor in a manner corresponding to the edge deviations determined. In this known web control system, the edge is read directly and without intermediary by the sensor, in particular an optical sensor. In the case of webs and strips which have diffuse or undulating edges or edges provided with protrusions and recesses, this known web edge control system experiences control difficulties particularly when the irregularities of the edge contour have a small repeat interval, i.e. the changes in the edge contour occur at very short intervals after one another. Because of this, the web edge control system can fall completely out of step.

Self-adhesive labels are manufactured, in known manner, in such a way that, from a label material which is carried by a strip-shaped carrier and is releasably pasted to it, individual labels are punched out to the desired shape and size by punching with a suitable punching tool. The carrier, with the self-adhesive labels adhering to it, is then wound to form a label spool after the removal of the residue of label material which is not required, i.e. after the so-called waste or surplus removal. This label spool is later inserted into a label dispenser by means of which the released labels are transferred onto an object or article which has to be labeled. A great desire exists in practice to be able, in addition, to place other parts under such self-adhesive labels with the possibility of accurately transferring or pasting such other parts with the self-adhesive label on the object to be labeled in a single procedure. These can, for example, be security labels from a security label strip which is provided with a diffuse edge contour and has to be guided, together with the cover web, into the correct position.

The invention is explained in more detail in the following description by means of embodiment examples of the appliance according to the invention shown in the drawing in FIGS. 12 and 13.

Figure 12:
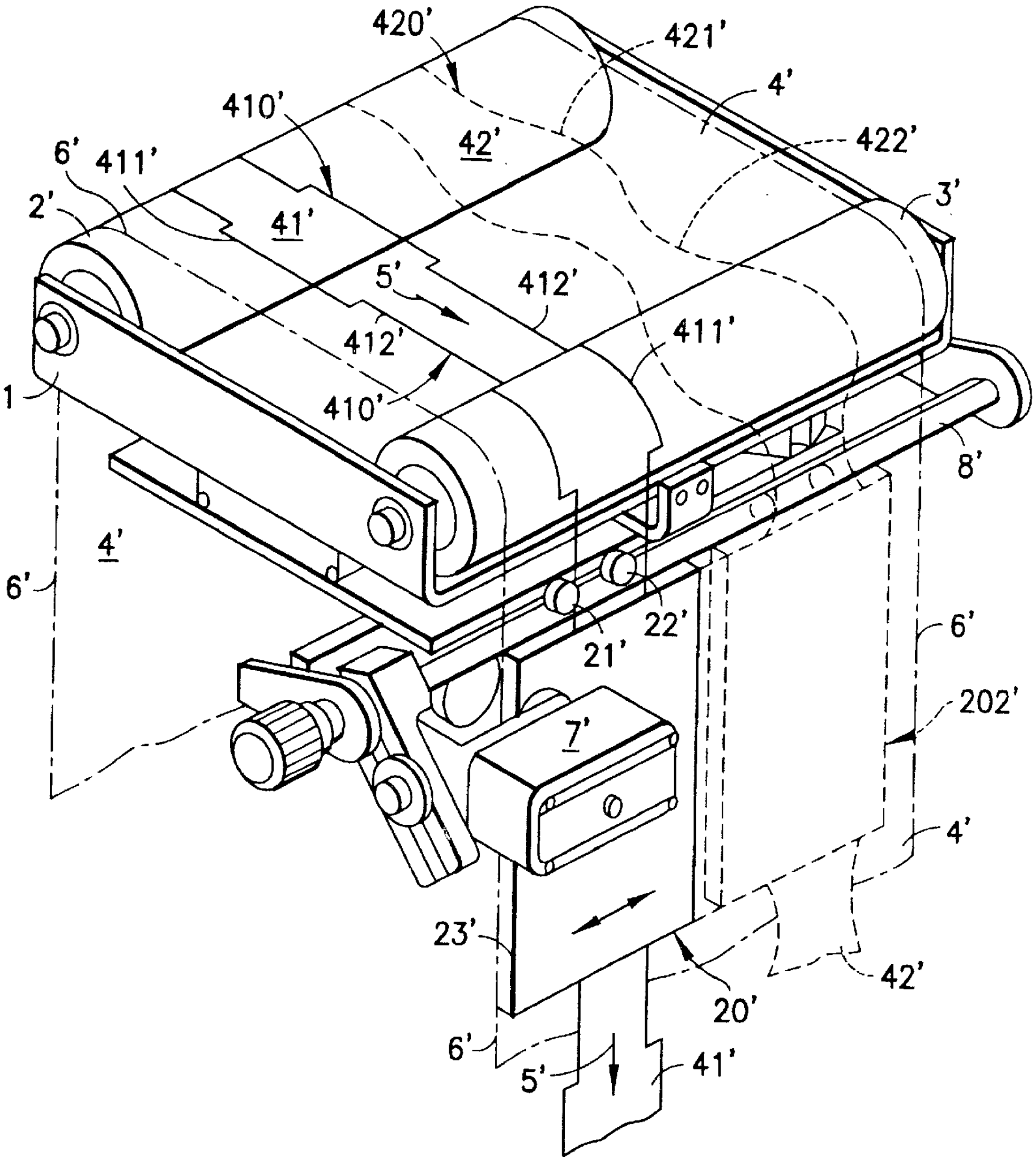
FIG. 12 shows, in perspective representation, a web edge control system which is provided with the slot guide according to the invention.

The invention is shown in perspective in FIG. 12 in association with a known web edge control system. The web edge control system includes a rotary frame 1' on which two control rollers 2' and 3' are supported. A web 4' is guided in the direction of the arrow 5' over the control rollers 2' and 3', is deflected at them and is pulled along by drive rollers (not shown). A center of rotation (not shown) for the rotary frame 1', about which the latter is therefore rotated transverse to the transport direction, is located under the control roller 2' centrally and at right angles to the control roller 2'. By this means, the part of the web 1' which rests on the control roller 3', in particular, is deflected transverse to the transport direction 5' and displaced for the lateral open-chain and closed-loop control. A sensor 7' is provided for determining the position of the edge 6' of the web 4'. This preferably optical sensor 7' is, if necessary, fastened to a rail 8' extending transversely over the width of the web 4' and adjustable transverse to the transport direction 5'. The rail 8' is in turn fastened to the rotary frame 1'. By this means, the sensor 7' can be laterally adjusted to the desired position of the edge 6'. The manner in which the sensor 7' and its signals interact with the drive of the rotary frame for the lateral adjustment of the web 4' and other sub-assemblies is not shown or described in any more detail here because it is not the subject matter of the invention. Reference is, however, made to the fact that the web designated by 4', together with its edge 6' located under the sensor 7' and the opposite edge 6", represents the greatest possible width which can be operated by the illustrated web edge control system of such a web. For reasons of better representation with respect to the invention, this web 4' is shown in FIG. 1. The associated edges 6' and 6" are straight edges.

A slot guide 20' configured in accordance with invention is shown diagrammatically in FIG. 1. It can be displaced by easy-running rollers 21' and 22' transverse to the transport direction 5' on the rail 8' fastened to the rotary frame 1', as is indicated by the double arrow. The slot guide 20' can also be guided transverse to the transport direction 5' on its own fully independent rail which is fastened to the rotary frame 1'. A web 41', whose edges 410' have approximately step-shaped protruding parts 411' of larger width and recessed parts 412' of smaller width, is guided in the slot guide 20'. This type of edge contour can be generally designated as a diffuse or, more precisely, as a stepped undulating edge. This web 41' is inserted in the slot guide 20' in such a way that it is drawn through the opening formed by the slot guide 20' with only a little clearance above and below and at the edges 410'. In the case of a lateral displacement of the web 41', therefore, the slot guide 20' is moved laterally with it. It can be said that the slot guide 20' "floats" with the web 41', i.e. it necessarily accommodates its lateral motions. The slot guide 20' has a straight edge 23' which supplies a reference edge for the sensor 7'. Instead of the diffuse edge 410' of the web 41' with the protruding and recessed parts 411' and 412', the sensor 71 scans the straight edge 23' of the slot guide 20', which acts as the reference edge. Because of the imposed motion of the slot guide 20', this reference edge follows the motion of the web 41' and can therefore be used for the lateral control and guidance of the web 41'.

Figure 13:
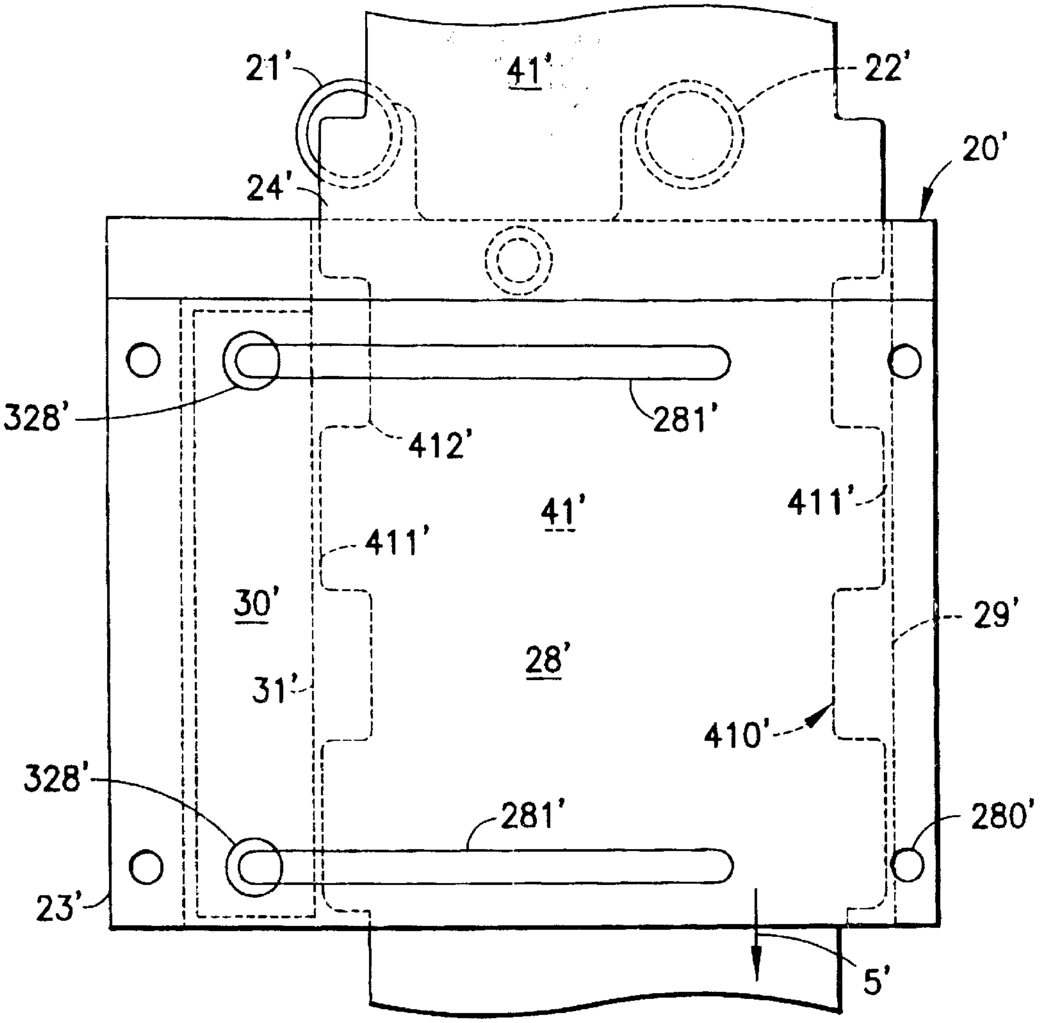
FIG. 13 shows, diagrammatically, the front view of the slot guide according to the invention.
Figure 14:
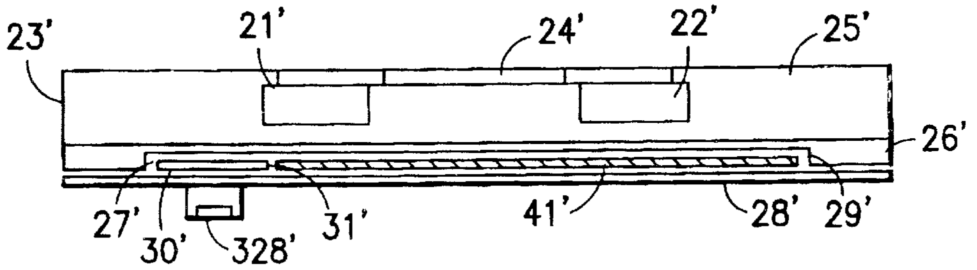
FIG. 14 shows, diagrammatically and in plan view, the slot guide shown in FIG. 13.

The construction of the slot guide is shown in more detail, diagrammatically in front view and plan view, in FIG. 13 and 14. The rollers 21' and 22' are fastened to a supporting stirrup piece 24' to which is attached a retention frame 25' with a base part 26'. A depression 27' is machined into the base part 26' and in it is located the web 41', on the one hand, and, on the other, a part 30' which can be adjusted within the slot guide 20' transverse to the transport direction, as shown by the double arrow in FIG. 12. Both of these, the web 41' and the adjustable part 30', are covered opposite to the depression 27' by a cover 28' which is, for example, fastened to the base part 26' and the support frame 25' by four bolts 280'. In consequence, the protruding parts 411' of the web 4' are located to the right in FIG. 12 on a first, stationary lateral stop 29' and, to the left in FIG. 12, on a second lateral stop 31' which can be adjusted, corresponding to the adjustability of the part 30'. The lower surface of the web 4' is located in the depression 27' of the base part 26' and is covered on its upper surface and retained by the cover 28'. The space formed between these boundary parts 29', 27', 31' and 28' is dimensioned in such a way that the web 41' can slide easily without much frictional loss, on the one hand, and still forms a sufficiently dimensioned lateral imposed guidance for the slot guide 20', on the other. As an example, the lateral clearance can be approximately 0.2 mm and the height clearance approximately 0.5 mm.

As already described above, the adjustable part 30' forms a laterally adjustable stop 31' which is adjustable, as shown in FIG. 13 and 14, from the maximum web width to a smaller web width relative to the permanent lateral stop 29'. For this purpose, two elongated holes 281' are provided in the cover 28'. Fixing screws 328' are guided in these elongated holes 281'. These fixing screws 328' are connected to the adjustable part 30' and hold it firmly on the cover 28'. After loosening, they can be displaced with it transverse to the transport direction 5' and hold it in the new position after tightening. By this means, an adjustable lateral stop 31' is formed in a simple manner within the slot guide 20'.

The slot guide 20' is produced from light-weight material, in particular aluminum, in order to support—with low weight—easy movement along with the lateral motion of the web guided in it.

In accordance with a further embodiment example of the invention, a plurality of webs, even with differently shaped diffuse edge contours, can be transported adjacent to one another and guided in a directed manner. A second web 42' is shown in interrupted line representation parallel to the web 41' in FIG. 12. This web 42' has edges 420' formed in undulations with protruding swellings 421' and withdrawal recesses 422'. A second slot guide 202', which is shown by interrupted lines in FIG. 12 as an indication, is provided for this web 42'. This second slot guide 202' is mechanically connected to the first slot guide 20' (by means which are not shown). The straight edge 23', of the first slot guide 20', located near the sensor 7' acts as the reference edge for both webs 41' and 42' which then run adjacent to one another. In this way, therefore, it is possible to provide open-chain and closed-loop control with lateral direction for two, and if necessary also three or more, webs which are parallel to one another.

In a further embodiment, the slot guide according to the invention can also be configured in such a way that one or preferably a plurality of very narrow strips, such in particular as only one millimeter or a few millimeters wide metal strips (which are, for example, included as security strips in bank notes and for which direct recognition at the per se straight edge produces substantial difficulties because of the small web width in the case of edge detection by the sensor) is or are guided in the slot guide in one or a plurality of openings.

In advantageous manner, the slot guide configured according to the invention creates a low-cost part which solves the flutter problem (arising in the case of all conventional web edge control systems during the processing of webs with diffuse edges) in a simple, reliable and low-cost manner. In addition, the invention creates the possibility of guiding one or a plurality of particularly narrow strips adjacent to one another and of controlling them laterally by means of the common reference edge.

What is claimed is:

1. Appliance for manufacturing a strip with self-adhesive labels or other materials with parts placed underneath, in particular a label strip on which removable, self-adhesive labels are applied to a carrier strip, on which carrier strip other parts are provided under the actual label, which other parts, when the self-adhesive label is detached from the carrier strip, can be transferred together with the latter onto an object to be furnished with the label, the appliance comprising a first supply spool (10), with associated transport device, from which a first carrier strip (11) with labels (12) is unrolled, a first removal station (13) at which the labels (12) from this first carrier strip (11) are released and, after forward transport over a region which is free from carrier strip, are deposited on a second carrier strip (14), a first winding spool (15), with associated transport device, on which the first carrier strip (11) is wound, a second supply spool (20), with associated transport device, from which is unrolled a third carrier strip (21) with other parts (22), which are applied to it and which have to be arranged under the label (12), a second removal station (23) at which the other parts (22) are released from this third carrier strip (21) and, after forward transport over a region which is free from carrier strip, are deposited on a fourth carrier strip (24), a second winding spool (25), with associated transport device, on which the third carrier strip (21) is wound, a controlled intermittent drive for the third carrier strip (21), with the other parts (22) on it, by means of which this third carrier strip is guided locally, fed forward in a controlled manner and intermittently driven in such a way that the other parts (22) can be deposited on the fourth carrier strip (24) at desired position, the controlled intermittent drive including holding and drive rollers (29) for intermittent forward feed of the third carrier strip (21) with the other parts (22) on it, and a quick-action clutch operatively connected to the holding and drive rollers so as to connect and disconnect the holding and drive rollers from a drive motor, a third winding spool (15), with associated transport device, on which the second carrier strip (14) can be wound, the winding speed corresponding approximately to the unwinding speed with which the first carrier strip (11) is unwound from the first supply spool (10), wherein the fourth carrier strip (24) furnished with the deposited other parts (22) comprises the second carrier strip (14) on which the labels (12) released at the first removal station are deposited accurately with respect to location and time at the desired position and, by this means, cover the other parts (22) at least partially.

2. Appliance according to claim 1, wherein the first carrier strip (11) from which the self-adhesive labels (12) are removed at the first removal station (13) is used as the second carrier strip (14) or the fourth carrier strip (24) on which the other parts (22) and subsequently the labels (12) are deposited, a corresponding, suitable guide (16) and feed system for the first carrier strip (11) being provided.

3. Appliance according to claim 1, wherein the second removal station (23) is arranged substantially at right angles to the first removal station (13).

4. Appliance according to claim 1, wherein web edge controls (17, 27) are provided for the carrier strips (11, 14, 21, 24) for the lateral open-chain and closed-loop control of the strip guidance.

5. Appliance according to claim 1, wherein for each carrier strip (11, 14, 21, 24), a respective electric motor, which can be steplessly controlled is provided for the traction and the retardation of the respective carrier strip (11, 14, 21, 24).

6. Appliance according to claim 1, wherein a central servomotor with programmable frequency converter is provided for the coordinated driving and retarding procedure of all transport devices.

7. Appliance according to claim 1, wherein a detection circuit for faulty labels is provided for each individual carrier strip (11, 14, 21, 24) furnished with labels (12) or other parts (22).

8. Appliance according to claim 1, wherein an inspection appliance is provided for detecting cracks in the carrier strip (11, 14, 21, 24) for each individual carrier strip furnished with labels (12) or other parts (22).

9. Appliance according to claim 1, wherein expanding shafts (18, 28) are provided to and from which air can be automatically supplied and extracted and on which the supply spools (10, 20) and winding spools (15, 25) are secured.

10. Appliance according to claim 1, wherein an adjustable detection circuit is provided for the spool end of the carrier strip (21) for the other parts (22), which detection circuit reports detection by flashing light.

11. Appliance according to claim 1, wherein the holding and drive rollers (29) are manufactured from a rubber.

12. Appliance according to claim 1, wherein the holding and drive rollers (29) can be at least one of exchanged, automatically adjusted and pneumatically adjusted.

13. Appliance according to claim 1, wherein security elements are placed as the other parts (22) under the labels (12), it being possible to excite the security elements one of electromagnetically acoustically, and by radio frequencies.

14. Appliance according to claim 1, wherein sales tabs or instruction tabs or handling loops (522) can be placed as the other parts (22) under the labels (12) in such a way that interesting parts (522) protrude from under the label (12).

15. Appliance according to claim 1, wherein the control system is provided with a microcontroller, by means of which, different placements can be carried out, another part (22) is placed under each label (12) or sticker or only under each second, third, seventh or under each second, fifth, ninth label (12) or sticker or some other advantageous sequence of labels (12) or stickers.

16. Appliance according to claim 15, wherein sensors are provided at various positions on the transport paths of the various carrier strips (11, 14, 21, 24), by means of which sensors the control system generates corresponding position signals for the cyclically correct placing of the other parts (22) in the correct position on the fourth carrier strip (24), for the operation at the correct time of the holding and drive rollers (29) to feed the third carrier strip (21) with the other parts (22) forward intermittently and to detect, set and control the various speeds of the individual carrier strips (11, 14, 21, 24).

17. Appliance according to claim 1, wherein the other parts (22) to be placed are deposited on the fourth carrier strip (24) in such a way that their adhesive sides (722) come together or are laminated together with the adhesive side (122) of the label (12) covering them, a detachable label (127) with an adhesive-free zone (128) being formed by this means.

18. Appliance according to claim 1, wherein instead of labels (12) under which other parts (22) are placed, cardboard strips or strips of plastic or parts already punched into shape and arranged on a carrier strip, under which other parts (22) are placed by means of the appliance, are provided.

19. Appliance for manufacturing a strip with self-adhesive labels or other materials with parts placed underneath, in particular a label strip on which removable, self-adhesive labels are applied to a carrier strip, on which carrier strip other parts are provided under the actual label, which other parts, when the self-adhesive label is detached from the carrier strip, can be transferred together with the latter onto an object to be furnished with the label, the appliance comprising a first supply spool (10), with associated transport device, from which a first carrier strip (11) with labels (12) is unrolled, a first removal station (13) at which the labels (12) from this first carrier strip (11) are released and, after forward transport over a region which is free from carrier strip, are deposited on a second carrier strip (14), a first winding spool (15), with associated transport device, on which the first carrier strip (11) is wound, a second supply spool (20), with associated transport device, from which is unrolled a third carrier strip (21) with other parts (22), which are applied to it and which have to be arranged under the label (12), a second removal station (23) at which the other parts (22) are released from this third carrier strip (21) and, after forward transport over a region which is free from carrier strip, are deposited on a fourth carrier strip (24), a second winding spool (25), with associated transport device, on which the third carrier strip (21) is wound, a controlled intermittent drive for the third carrier strip (21), with the other parts (22) on it, by means of which this third carrier strip is guided locally, fed forward in a controlled manner and intermittently driven in such a way that the other parts (22) can be deposited on the fourth carrier strip (24) at desired position, a third winding spool (15), with associated transport device, on which the second carrier strip (14) can be wound, the winding speed corresponding approximately to the unwinding speed with which the first carrier strip (11) is unwound from the first supply spool (10), wherein the fourth carrier strip (24) furnished with the deposited other parts (22) comprises the second carrier strip (14) on which the labels (12) released at the first removal station are deposited accurately with respect to location and time at the desired position and, by this means, cover the other parts (22) at least partially wherein the other parts (22) to be placed are deposited on the fourth carrier strip (24) in such a way that their adhesive sides (722) come together or are laminated together with the adhesive side (122) of the label (12) covering them, a detachable label (127) with an adhesive-free zone (128) being formed by this means, and wherein the second removal station (73) is arranged adjacent the first removal station (13) and is inclined in the transport direction (100) of the labels (12) released from the first carrier web (11) in such a way that the other parts (22) released from the third carrier web (21) by the second removal station (73) come to rest with their adhesive side (722) directly on the adhesive side (127) of the label (12) transported over the top and released immediately before from the first carrier web (11) by the first removal station (13), the two adhesive surfaces (722, 127) including an acute angle between them and the two subsequently being jointly deposited and pressed onto the second carrier strip (14), the side (128) of the other part (22) not provided with adhesive coming to rest directly on the second carrier strip (14) or the fourth carrier strip (24).

* * * * *